US011741418B1

(12) United States Patent
Lefkow et al.

(10) Patent No.: US 11,741,418 B1
(45) Date of Patent: *Aug. 29, 2023

(54) MANAGING SHIPMENTS BASED ON DATA FROM A SENSOR-BASED AUTOMATIC REPLENISHMENT DEVICE

(71) Applicant: Amazon Technologies, Inc., Seattle, WA (US)

(72) Inventors: Dave Jonathan Lefkow, Bellevue, WA (US); Samuel Stevens Heyworth, Seattle, WA (US); Daniel Osias, Seattle, WA (US); Amirali Virani, Bellevue, WA (US); Hannah McClellan Richards, Boise, ID (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,696

(22) Filed: Apr. 27, 2022

Related U.S. Application Data

(63) Continuation of application No. 15/918,205, filed on Mar. 12, 2018, now Pat. No. 11,354,617.

(51) Int. Cl.
*G06Q 10/083* (2023.01)
*G06Q 10/087* (2023.01)

(52) U.S. Cl.
CPC ......... *G06Q 10/083* (2013.01); *G06Q 10/087* (2013.01)

(58) Field of Classification Search
CPC ............................ G06Q 10/083; G06Q 10/087
See application file for complete search history.

(56) References Cited

U.S. PATENT DOCUMENTS 5,168,445 A 12/1992 Kawashima et al.
5,235,509 A 8/1993 Mueller et al.
(Continued)

FOREIGN PATENT DOCUMENTS

WO 2016/149674 A1 9/2016

OTHER PUBLICATIONS

Deloitte, "Using smart sensors to drive supply chain innovation" 2018, <https://www2.deloitte.com/content/dam/Deloitte/us/Documents/process-and-operations/us-cons-smart-sensors.pdf>. (Year: 2018).*

(Continued)

*Primary Examiner* — Shannon S Campbell
*Assistant Examiner* — Manal A. Alsamiri
(74) *Attorney, Agent, or Firm* — Kilpatrick Townsend & Stockton LLP

(57) ABSTRACT

Techniques for selecting a delivery method based on sensor data of an automatic replenishment device (ARD) are described. In an example, a computer system is communicatively coupled with the ARD and receives the sensor data from the ARD. The sensor data is generated by a sensor of the ARD and indicates an amount of an item that is stored by the ARD. The computer system maintains, in a profile, a consumption rate based on the sensor data. The computer system determines that the amount of the item is less than a threshold amount based on the consumption rate and, based on this amount, identifies available delivery methods for a delivery of a replacement amount of the item. The computer (Continued)

system selects one of the delivery methods based on the consumption rate and causes the delivery of the replacement amount of the item based on the selected delivery method.

20 Claims, 8 Drawing Sheets

(56) References Cited

U.S. PATENT DOCUMENTS

| | | | |
|---|---|---|---|
| 6,204,763 | B1 | 3/2001 | Sone |
| 6,799,085 | B1 | 9/2004 | Crisp, III |
| 7,542,866 | B1 | 6/2009 | Lovegren et al. |
| 8,005,761 | B1* | 8/2011 | Braumoeller ........ G06Q 10/087 705/332 |
| 8,260,672 | B2 | 9/2012 | Weel et al. |
| 8,718,620 | B2 | 5/2014 | Rosenblatt |
| 9,267,834 | B2 | 2/2016 | Chowdhary et al. |
| 9,619,831 | B1 | 4/2017 | Kumar et al. |
| 10,360,617 | B2 | 7/2019 | High et al. |
| 10,373,118 | B1 | 8/2019 | Lefkow et al. |
| 10,402,779 | B2 | 9/2019 | Mai |
| 10,438,276 | B2 | 10/2019 | Godsey et al. |
| 10,445,672 | B2 | 10/2019 | Renfroe |
| 10,445,819 | B2 | 10/2019 | Renfroe |
| 10,474,987 | B2 | 11/2019 | Corona et al. |
| 10,846,780 | B2 | 11/2020 | Lefkow et al. |
| 10,853,870 | B2 | 12/2020 | Kramer et al. |
| 10,909,610 | B1 | 2/2021 | Kramer et al. |
| 11,010,711 | B1 | 5/2021 | Kramer et al. |
| 11,023,855 | B1 | 6/2021 | Kramer et al. |
| 11,100,464 | B1 | 8/2021 | Lefkow et al. |
| 11,137,479 | B1 | 10/2021 | Kramer et al. |
| 2006/0206373 | A1* | 9/2006 | Blair .................... G06Q 20/203 705/22 |
| 2007/0162326 | A1 | 7/2007 | Weel et al. |
| 2008/0113614 | A1 | 5/2008 | Rosenblatt |
| 2010/0076903 | A1* | 3/2010 | Klingenberg ........ G06Q 10/083 707/E17.107 |
| 2010/0106588 | A1* | 4/2010 | Jones ................ G06Q 30/0223 709/248 |
| 2011/0153466 | A1 | 6/2011 | Harish et al. |
| 2012/0038456 | A1 | 2/2012 | Pikkarainen et al. |
| 2013/0038455 | A1 | 2/2013 | Chowdhary et al. |
| 2013/0231877 | A1 | 9/2013 | Weber et al. |
| 2013/0300595 | A1 | 11/2013 | Hemmendorff |
| 2014/0095479 | A1 | 4/2014 | Chang et al. |
| 2014/0203040 | A1 | 7/2014 | Clark et al. |
| 2015/0142621 | A1 | 5/2015 | Gray et al. |
| 2015/0178654 | A1 | 6/2015 | Glasgow et al. |
| 2015/0186836 | A1 | 7/2015 | Chouhan et al. |
| 2015/0162421 | A1 | 10/2015 | Harvey et al. |
| 2015/0278912 | A1 | 10/2015 | Melcher et al. |
| 2015/0302510 | A1* | 10/2015 | Godsey .............. G06Q 30/0635 705/26.81 |
| 2015/0329260 | A1 | 11/2015 | Singh |
| 2016/0019780 | A1 | 1/2016 | Gettings et al. |
| 2016/0040580 | A1 | 2/2016 | Khaled et al. |
| 2016/0132821 | A1* | 5/2016 | Glasgow .............. G06Q 10/087 705/28 |
| 2016/0134930 | A1* | 5/2016 | Swafford .............. A47F 5/0068 725/80 |
| 2016/0180239 | A1 | 6/2016 | Frankel et al. |
| 2016/0203431 | A1 | 7/2016 | Renfroe |
| 2016/0229678 | A1 | 8/2016 | DiFatta et al. |
| 2016/0314514 | A1 | 10/2016 | High et al. |
| 2016/0347540 | A1 | 12/2016 | Skocypec et al. |
| 2017/0070523 | A1 | 3/2017 | Bailey et al. |
| 2017/0118845 | A1 | 7/2017 | Lane et al. |
| 2017/0201057 | A1 | 7/2017 | Ahlawat et al. |
| 2017/0300984 | A1 | 10/2017 | Hurwich |
| 2018/0012158 | A1* | 1/2018 | Cholewinski ....... G06Q 10/0633 |
| 2018/0053140 | A1 | 2/2018 | Baca et al. |
| 2018/0053247 | A1 | 2/2018 | Lewis et al. |
| 2018/0144290 | A1* | 5/2018 | Alvo .................... G06Q 10/087 |
| 2018/0164143 | A1 | 6/2018 | Gurumohan et al. |
| 2018/0165627 | A1 | 6/2018 | Jones et al. |
| 2018/0260779 | A1 | 9/2018 | Singh et al. |
| 2018/0308514 | A1 | 10/2018 | Li et al. |
| 2019/0108483 | A1 | 4/2019 | Tineo |
| 2019/0295148 | A1 | 9/2019 | Lefkow et al. |
| 2020/0105409 | A1 | 4/2020 | Kochar et al. |

OTHER PUBLICATIONS

Kareem, Adnan & Alrawi, Maha & Al Attar, Israa. (2017). Smart Inventory Control System Based on Wireless Sensor Network. < https://www.researchgate.net/publication /319880991_Smart_ Inventory_Control_System_Based_on_Wireless_Sensor_ Network> (Year: 2017).*

U.S. Appl. No. 15/696,040, "Sensor Data-Based Reordering of Items", filed Sep. 5, 2017.

U.S. Appl. No. 15/963,761, "Sensor-Related Improvements to Automatic Replenishment Devices", filed Apr. 26, 2018.

U.S. Appl. No. 15/918,205, "Managing Shipments Based on Data From a Sensor-Based Automatic Replenishment Device", filed Mar. 12, 2018.

U.S. Appl. No. 15/927,998, "Predictive Consolidation System Based on Sensor Data", filed Mar. 21, 2018.

U.S. Appl. No. 15/927,324, "Managing Electronic Requests Associated With Items Stored by Automatic Replenishment Devices", filed Mar. 21, 2018.

U.S. Appl. No. 15/934,780, "Test-Enabled Measurements for a Sensor-Based Device", filed Mar. 23, 2018.

U.S. Appl. No. 15/927,779, "Product Specific Correction for a Sensor-Based Device", filed Mar. 20, 2018.

U.S. Appl. No. 15/927,946, "Automatic Replenishment of Items Utilizing a Sensor-Based Device", filed Mar. 21, 2018.

U.S. Appl. No. 15/928,370, "Product and Lid Identification for Sensor-Based Device", filed Mar. 22, 2018.

U.S. Appl. No. 15/928,409, "LED Enhanced Product and Lid Identification for Sensor-Based Device", filed Mar. 22, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/ Never-run-food-Smart-mat-tells-low-milk-fridge-cam-shows-s-inside-shopping.html, Jan. 5, 2016, 8 pages.

U.S. Appl. No. 15/927,990, "Order Quantity and Product Recommendations Based on Sensor Data", filed Mar. 21, 2018.

Non-Final Office Action, U.S. Appl. No. 15/927,998, 27 pages, dated Mar. 21, 2018.

Notice of Allowance, U.S. Appl. No. 15/927,998, 7 pages, dated Mar. 27, 2019.

International Search Report and Written Opinion, PCT/US2019/022215, 11 pages, dated Apr. 29, 2019.

"Dash Replenishment Service CX Guidelines," Dash Replenishment Service, XP055598411, Available online at http://web.archive. org/web/20171208012109/https://developer.amazon.com/docs/das h/customer-experience-guidelines.html, Dec. 8, 2017, 9 pages.

"Frequently Asked Questions," Dash Replenishment Service, XP055598417, Available online at https://web.archive.org/web/ 201701208012934/https://developer.amazon.com/docs/das h/faqs. html, Dec. 8, 2017, 5 pages.

"Dash Replenishment Service Glossary, "Dash Replenishment Service, XP055598456, Available online at https://web.archive.org/ web/20171208041422/https://developer.amazon.com/docs/das h/glossary.html, Dec. 8, 2017, 6 pages.

"Notification Messages (DRS)," Dash Replenishment Service, XP055598457, Available online at https://web.archive.org/web/ 201701208041525/https://developer.amazon.Gom/docs/das h/notification-messages.html, Dec. 8, 2017, 14 pages.

"GetOrderInfo Endpoint," Dash Replenishment Service, XP055598458, Available online at https://web.archive.org/web/20170208041609/ https://developer.amazon.com/docs/das h/getorderinfo-endpoint. html, Dec. 8, 2017, 6 pages.

(56) References Cited

OTHER PUBLICATIONS

"SlotStatus Endpoint,"Dash Replenishment Service, XP055598461, Available online at: https://web.archive.org/web/20171208041548/ https://developer.amazon.com/docs/dash/slotstatus-endpoint.html, Dec. 8, 2017, 7 pages.
"Amazon Dash Replenishment," XP054979477, Available online at: https://www.youtube.com/watch?v=vTYcWG 6BIDY, Jan. 19, 2016, 3 pages.
"Amazon Dash Replenishment for Developers," Youtube, Available online at: https://www.youtube.com/watch?v=WS42WcuSyVU, Jan. 30, 2017, 5 pages.
International Search Report and Written Opinion, PCT/US2019/ 022226, 14 pages, dated Jul. 2, 2019.
Non-Final Office Action, U.S. Appl. No. 15/927,946, 35 pages, dated Dec. 26, 2019.
Welch, et al., "Seven Keys to ERP Success,", Strategic Finance, vol. 89, No. 3, Institute of Management Accountants, Sep. 2007, 8 pages.
Li, et al., "Discussion of Principle and Application for Internet of Things," Applied Mechanics and Materials, vol. 347-350, Aug. 8, 2013, 4 pages.
Non-Final Office Action, U.S. Appl. No. 15/927,990, 18 pages, dated Feb. 28, 2020.
Non-Final Office Action, U.S. Appl. No. 15/927,324, 31 pages, dated Mar. 27, 2020.
Non-Final Office Action, U.S. Appl. No. 15/928,370, 14 pages, dated Apr. 29, 2020.
Final Office Action, U.S. Appl. No. 15/927,946, 16 pages, dated Jun. 24, 2020.
Non-Final Office Action, U.S. Appl. No. 15/918,205, 29 pages, dated Jul. 10, 2020.
Notice of Allowance, U.S. Appl. No. 15/927,990, 11 pages, dated Jul. 16, 2020.
Notice of Allowance, U.S. Appl. No. 15/928,370, 9 pages, dated Jul. 24, 2020.
Final Office Action, U.S. Appl. No. 15/927,324, 31 pages, dated Aug. 4, 2020.
Non-Final Office Action, U.S. Appl. No. 15/934,780, 9 pages, dated Aug. 14, 2020.
Corrected Notice of Allowability, U.S. Appl. No. 15/927,990, 8 pages, dated Aug. 28, 2020.
Non-Final Office Action, U.S. Appl. No. 15/928,409, 17 pages, dated Sep. 9, 2020.
International Preliminary Report on Patentability, PCT/US2019/ 022215, 8 pages, dated Oct. 1, 2020.
International Preliminary Report on Patentability, PCT/US2019/ 022226, 10 pages, dated Oct. 1, 2020.
Notice of Allowance, U.S. Appl. No. 15/927,946, 10 pages, dated Oct. 2, 2020.
Corrected Notice of Allowability, U.S. Appl. No. 15/927,946, 4 pages, dated Oct. 6, 2020.
Non-Final Office Action, U.S. Appl. No. 15/963,761, 22 pages, dated Oct. 15, 2020.
Non-Final Office Action, U.S. Appl. No. 15/927,324, 26 pages, dated Nov. 5, 2020.
Corrected Notice of Allowability, U.S. Appl. No. 15/927,946, 2 pages, dated Nov. 9, 2020.
Notice of Allowance, U.S. Appl. No. 15/934,780, 7 pages, dated Dec. 30, 2020.
Non-Final Office Action, U.S. Appl. No. 15/926,779, 25 pages, dated Jan. 21, 2021.
Notice of Allowance, U.S. Appl. No. 15/927,324, 12 pages, dated Feb. 4, 2021.
Final Office Action, U.S. Appl. No. 15/918,205, 31 pages, dated Feb. 17, 2021.
Final Office Action, U.S. Appl. No. 15/928,409, 19 pages, dated Mar. 4, 2021.
Non-Final Office Action, U.S. Appl. No. 16/530,562, 8 pages, dated Mar. 16, 2021.
Final Office Action, U.S. Appl. No. 15/963,761, 35 pages, dated Apr. 14, 2021.
Corrected Notice of Allowability, U.S. Appl. No. 15/934,780, 2 pages, dated Apr. 16, 2021.
Notice of Allowance, U.S. Appl. No. 16/530,562, 9 pages, dated Apr. 27, 2021.
Corrected Notice of Allowability, U.S. Appl. No. 15/927,324, 2 pages, dated Apr. 29, 2021.
Notice of Allowance, U.S. Appl. No. 15/926,779, 12 pages, dated May 19, 2021.
Corrected Notice of Allowability, U.S. Appl. No. 15/926,779, 2 pages, dated May 26, 2021.
Non-Final Office Action, U.S. Appl. No. 15/928,409, 16 pages, dated Jun. 24, 2021.
Non-Final Office Action, U.S. Appl. No. 15/963,761, 40 pages, dated Jul. 12, 2021.
Supplemental Notice of Allowance, U.S. Appl. No. 16/530,562, 2 pages, dated Jul. 22, 2021.
Supplemental Notice of Allowance, U.S. Appl. No. 15/926,779, 2 pages, dated Jul. 28, 2021.
Non-Final Office Action, U.S. Appl. No. 15/918,205, 37 pages, dated Oct. 5, 2021.
Morton, "Smart Houses you can Live with: Technology Comes Home for Calgarians,", Available online at: https://dialog.proquest. com/professional/docview/245247947?accountid=131444, Jan. 8, 2005, 4 pages.
Final Office Action, U.S. Appl. No. 15/928,409, 20 pages, dated Jan. 19, 2022.
Notice of Allowance, U.S. Appl. No. 15/918,205, 10 pages, dated Feb. 7, 2022.
Kareem, et al., "Smart Inventory Control System Based on Wireless Sensor Network," International Journal of Engineering Research and Applications, vol. 7, No. 8, Available online at: https://www. researchgate.net/publication/319880991_Smart_Inventory_Control_ System_Based_on_Wireless_Sensor_Network, Aug. 2017, 8 pages.
Notice of Allowance, U.S. Appl. No. 15/963,761, 25 pages, dated Feb. 18, 2022.
Lopez, et al., "Monitoring Pest Insect Traps by Means of Low-Power Image Sensor Technologies," Sensors, vol. 12, No. 11, Nov. 13, 2012, 19 pages.
Corrected Notice of Allowability, U.S. Appl. No. 15/918,205, 7 pages, dated Mar. 8, 2022.
Supplemental Notice of Allowance, U.S. Appl. No. 15/963,761, 8 pages, dated Mar. 30, 2022.
Corrected Notice of Allowability, U.S. Appl. No. 15/918,205, 6 pages, dated Apr. 11, 2022.

* cited by examiner

Update consumption rate based on additional sensor data received from ARD after an initiation of the delivery using a first delivery method 702

Determine, based on the updated consumption rate, that the amount of the item stored by ARD will be depleted prior to a completion of the delivery 704

Select a second delivery method, the second delivery method being faster than the first delivery method 706

Send notification about the second delivery 708

Update the first delivery 710

MANAGING SHIPMENTS BASED ON DATA FROM A SENSOR-BASED AUTOMATIC REPLENISHMENT DEVICE

CROSS REFERENCE TO RELATED APPLICATIONS

This application is a Continuation of and claims priority to U.S. application Ser. No. 15/918,205, filed Mar. 12, 2018, and titled "MANAGING SHIPMENTS BASED ON DATA FROM A SENSOR-BASED AUTOMATIC REPLENISHMENT DEVICE", the content of which is herein incorporated in its entirety.

BACKGROUND

Automatic replenishment devices (ARDs) allow a user to receive updates about an item by associating the device with the item and identifying a user device (e.g., a mobile phone number). Over time, the ARD sends alerts to the user device about measurements related to the item. If deemed that the item should be replenished, the user may operate the user device, access an online retailer, and order an additional amount of the item. Additionally, the online retailer may offer a subscription service that can deliver additional amounts on a periodic basis. In both cases, a back-end system of the online retailer allocates a delivery resource to the user and schedules delivery of the additional item amount.

However, the integration between measurements generated by the ARD and the back-end system is typically limited. Generally, usage of delivery resources across the user base is not optimized or managed based on measurement data of ARDs.

BRIEF DESCRIPTION OF THE DRAWINGS

Various embodiments in accordance with the present disclosure will be described with reference to the drawings, in which:

FIG. 7 illustrates an example detailed flow for selecting a second delivery method after an initiation of a first delivery method based on sensor data of an ARD of a user indicating a change to the consumption rate after the initiation, in accordance with at least one embodiment.

DETAILED DESCRIPTION

Figure 1:
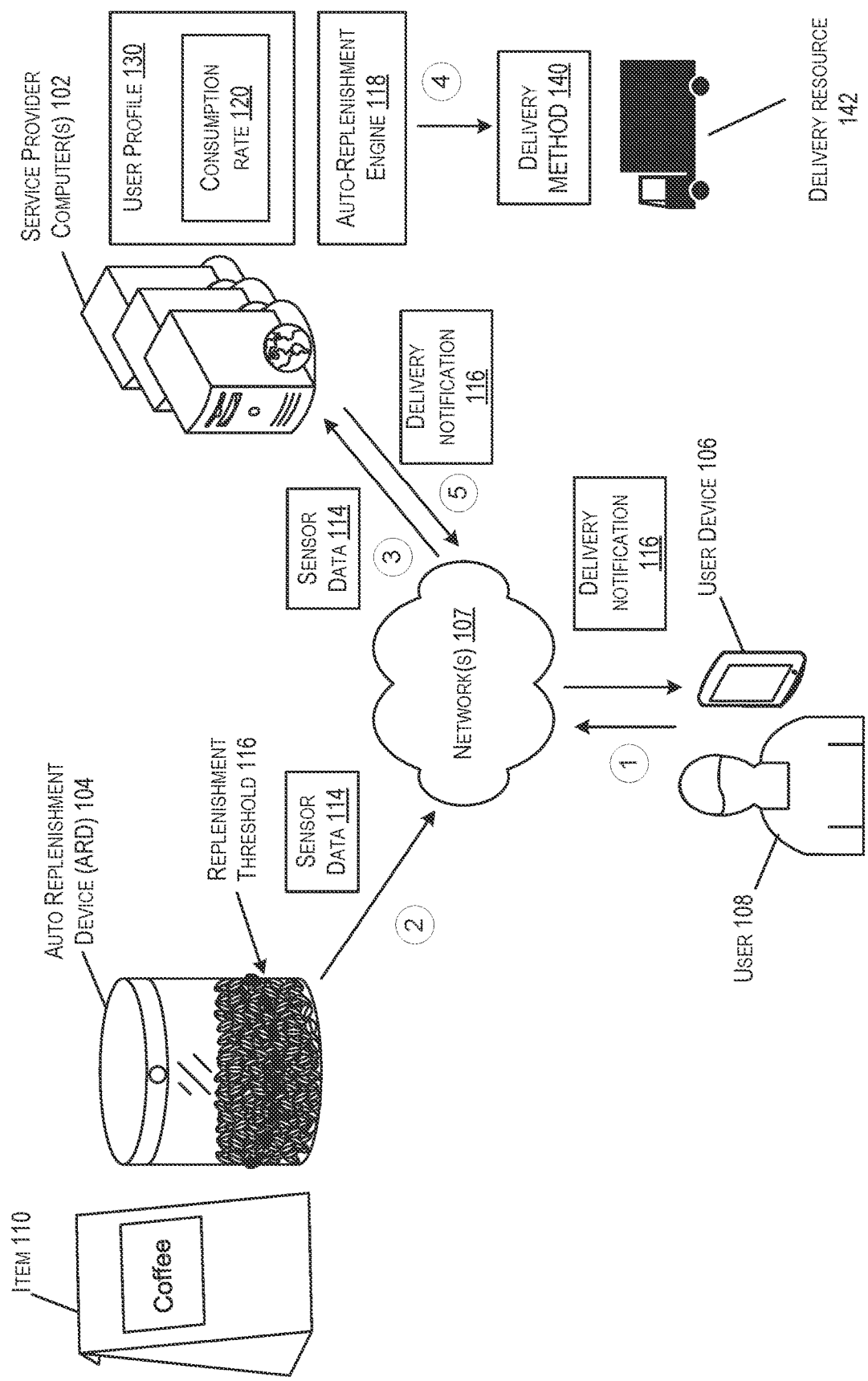
FIG. 1 illustrates a workflow for selecting a delivery method based on sensor data of an automatic replenishment device (ARD), in accordance with at least one embodiment.

Embodiments of the present disclosure are directed to, among other things, improving the integration between automatic replenishment devices (ARDs) and a back-end system of an online retailer and improving the management of delivery resources for delivering items associated with the ARDs. In an example, a user profile may be maintained on a computer system of the back-end system for a user of an ARD. The user profile may identify the ARD, the item that is stored by the ARD, and a user location. Over time, the computer system may receive, from the ARD, sensor data generated by a sensor of the ARD and indicating an amount of the item remaining at the ARD. The computer system may derive a consumption rate from the sensor data and store that rate in the user profile. The consumption rate may indicate a consumption of the amount of the item over time. Once the amount of the item is determined to be less than a threshold amount, the computer system may identify a plurality of available delivery methods for delivery of a replacement amount of the item to the user location. Based on the consumption rate (e.g., a low consumption), the computer system may select a delivery method from the plurality of available delivery methods (e.g., a decelerated delivery method) and cause the delivery of the replacement amount of the item to the user location based on the selected delivery method.

To illustrate, consider an example of a smart container storing coffee beans. Sensor data indicating a fill level of the coffee beans may be received at time intervals. That data may be stored in the user profile. The user profile may also identify a default delivery method for delivering new coffee beans to the user location (e.g., a five day ground delivery). The computer system may generate a consumption rate from the sensor data and may determine that, at a particular point in time, the fill level is less than ten percent (or some other threshold amount). Accordingly, the computer system may predict from a slope of the consumption rate that the user will likely run out of coffee beans within three days. Because this prediction indicates a higher than regular consumption, the computer system may detect that the default delivery method (e.g., the five day ground delivery) may not be suitable. Instead, the computer system may select an accelerated delivery method (e.g., a two day air delivery) for a delivery prior to the predicted run out date (e.g., in three days) and may accordingly generate a purchase order and delivery instructions for the new coffee beans. The back-end system may use the purchase order to obtain the new coffee beans from a fulfillment center and the delivery instructions to allocate delivery resources (e.g., robotic manipulators to un-shelf, pack, and move the new coffee beans to a ground delivery vehicle, the ground delivery vehicle to move the packed beans to an air delivery vehicle, etc.). The delivery resources execute the instructions to perform the delivery.

Many technological improvements over existing systems are possible. In an example, better integration between the ARD and the back-end system may be achieved. In particular, much of the processing may be offloaded from the ARD to the computer system of the back-end system. It may be sufficient for the ARD to send its raw sensor data and an identifier of the ARD. The processing of this data, computation of a consumption rate, and maintenance of a user profile may be performed by the computer system. This may translate into processing savings on the ARD, thereby allowing the ARD to lower its power consumption. Furthermore, the processing of the sensor data and maintenance of the user profile may allow additional optimization of services available from the back-end system. In particular, generating a consumption rate and monitoring its slope (e.g., how fast or slow the consumption is) may represent new data not available in existing systems that involve ARDs. This new data may be used to optimize the allocation and management of the delivery resources. In the existing systems, in the case of a user-based purchase, the user may select a delivery method. Or, in the case of a subscription service, the existing systems may use a default delivery method. However, beyond the user selection or the default method, these systems do not optimize the delivery resources. In contrast here, the new data may be used to select the optimal delivery method such as an accelerated delivery method or a decelerated delivery method relative to a default delivery method, depending on the consumption rate. The underlying delivery resources may be then allocated to support the optimal delivery method.

FIG. 1 illustrates a workflow 100 for selecting a delivery method based on sensor data of an automatic replenishment device (ARD), in accordance with at least one embodiment. In the illustrated example, a service provider computer(s) 102, an ARD 104, and a user device 106 may be configured to communicate with one another via network(s) 107 (e.g., a local area network, a wide area network, a cellular network, the Internet, or the like) via any suitable communications protocol. The service provider computer(s) 102 may receive sensor data 114 related to an item(s) 110 from the ARD 104 and may generate a consumption rate 120 about the item(s) 110 for a user 108 of the ARD 104. That consumption rate 120 is maintained in a user profile 130 and used to select a delivery method 140 to be carried, at least in part, by a delivery resource 142. The delivery resource 142, such as a delivery vehicle, may deliver a new amount of the item(s) 110 to a user location associated with the ARD 104 and/or the user 108. Although FIG. 1 illustrates a user profile 130, the consumption rate 120 may be maintained in any type of profile, where this profile may be associated with a user. For instance, a device profile may store the consumption rate, where the device profile corresponds to the ARD 104.

Prior to performance of the workflow 100, the user 108 may utilize any suitable means for obtaining the item(s) 110 (e.g., coffee beans). For example, the user 108 may utilize the user device 106 to browse an electronic marketplace for coffee beans. The electronic marketplace may be hosted by the service provider computer(s) 102 and/or another suitable system (which may be generally referred to herein as a back-end system). Utilizing interfaces provided by the electronic marketplace, the user 108 may purchase the coffee beans which may then be delivered to the user location. It should be appreciated that the item(s) 110 may be obtained using other means (e.g., purchased from a retail store, received as a gift, etc.).

Once obtained, the item(s) 110 may be placed on/in the ARD 104. In some embodiments, the ARD 104 may include a container and a lid as depicted in FIG. 1. The lid may include one or more time-of-flight (ToF) sensors. Once placed within the ARD 104 as depicted in FIG. 1, the item(s) 110 may fill the ARD 104 to some level (e.g., an actual fill level 112).

At step 1 of the workflow 100, the user 108 may utilize the user device 106 to perform a process for associating the item(s) 110 with the ARD 104. For example, the user device 106 may be utilized to access an application and/or website (e.g., hosted by the service provider computer(s) 102) to perform an association process. During the association process, the user device 106 (e.g., via the application and/or website) may be utilized to provide account information such as a name, a shipping address, billing information, or the like that the service provider computer(s) 102 stores in the user profile 130. Alternatively, the user device 106 may be utilized to sign in to the user profile 130 maintained by the service provider computer(s) 102 in order to access previously stored account information. During the association process, the user device 106 may be utilized to associate the item(s) 110 with the ARD 104. As a non-limiting example, an identifier (e.g., a serial number, bar code, or other suitable identifier) of the ARD 104 may be entered, scanned, and/or selected at the user device 106. An item identifier may also be entered, scanned, and/or selected at the user device 106. The user device 106 may then be utilized to provide an indication that the item identifier of the item(s) 110 is to be associated with the identifier of the ARD 104. The association between the item(s) 110 and the ARD 104 may be stored by the service provider computer(s) 102 (e.g., as part of the user profile 130 associated with the user 108 and/or user device 106).

At step 2 of the workflow 100, sensor data 114 generated by one or more sensors of the ARD 104 may be transmitted by the ARD 104 to the service provider computer(s) 102. The sensor data 114 may be collected and/or at any suitable time according to a predetermined schedule, at periodic time intervals, upon sensing user interaction with the item(s) 110 and/or the ARD 104, upon user input entered at the ARD 104, upon instruction from the service provider computer(s) 102 and/or the user device 106, or at any suitable time. The sensor data 114 may indicate property of the item (e.g., a distance measurement that corresponds to the measure fill level 116 based on sensed time of flight data by an optical sensor of the ARD 104, a weight based on a weight sensor of the ARD 104, and/or other sensed data that may indicate the amount of the item 110 stored by the ARD 104).

At step 3, the service provider computer(s) 102 may receive the sensor data 114. The sensor data 114 may include an identifier of the ARD 104 and raw data that indicates the amount of item 110 stored by the ARD 104 (e.g., the measured distance between the sensor and the item(s) 110 and a signal return rate (SRR) indicating some amount of light returned to the sensor given a particular light emission, weight data, etc.). The service provider computer(s) 102 may host an automatic replenishment engine 118.

At step 4, the automatic replenishment engine 118 may generate the consumption rate 120 from the sensor data 114 received at step 3. For example, the automatic replenishment engine 118 may compute, each time the sensor data 114 is received at a time interval, the amount of the item 110 stored by the ARD 104. A curve of this amount over time may be generated and may represent a consumption rate curve. The slope of the curve may indicate a speed at which the item may be consumed and may be used to predict a run-out-day (e.g., an expected point in time when the ARD 104 may no longer be storing any amount of the item 110 such as when the item 110 has been depleted from the ARD 104). A change in the slope (e.g., an increase) may indicate a change to (e.g., an increase in) the consumption. Based on the sensor data 114, the automatic replenishment engine 118 may also determine that the amount of the item 110 may be below a replenishment threshold 116 (e.g., the fill level may be less than ten percent of the total storage capacity of the ARD 104, the weight of the amount of the item 110 is less than ten percent of the original weight stored by the ARD 104, etc.) based on the amount being less than the replenishment threshold 116, the automatic replenishment engine 118 may identify the delivery methods available for a delivery of a replacement amount of the item 110 to the user location. Each of these methods may be associated with a set of delivery resources that, when used, would result in a delivery of the replacement amount to the user location by a certain time frame. Information about the available delivery methods may be stored in the user profile 130 in association with the item 110 or may be searched from a remote database. The automatic replenishment engine 118 may select the optimal delivery method from the available delivery methods. Multiple factors may be used for the selection. For example, one factor may relate to timing. In particular, the selected method may have a time frame occurring prior to the run-out-date such that the replacement amount may be delivered to the user location before the ARD 104 is out of the item. Another factor may relate to cost. In particular, if multiple delivery methods would result in the delivery prior to the run-out-date, the automatic replenishment engine 118 may select the most cost effective one. Once the most optimal delivery method is selected (e.g., the method that best matches the different selection factors), the automatic replenishment engine 118 may generate a purchase order for the replacement amount of the item 110 and delivery instructions. The delivery instructions may identify the selected delivery method and may be sent to a delivery management system (e.g., one hosted by the service provider computer(s) 102). The delivery management system may accordingly select and schedule the delivery resource(s) 142 for the delivery of the replacement amount.

At step 5, the service provider computer(s) 102 may send a delivery notification 116 to the user device via the network(s) 107. For example, the service provider computer(s) 102 may inform the user 108 of an initiation of the delivery and may identify the selected delivery method. The delivery notification 116 may also provide an option to the user to accept and/or cancel the delivery.

Figure 2:
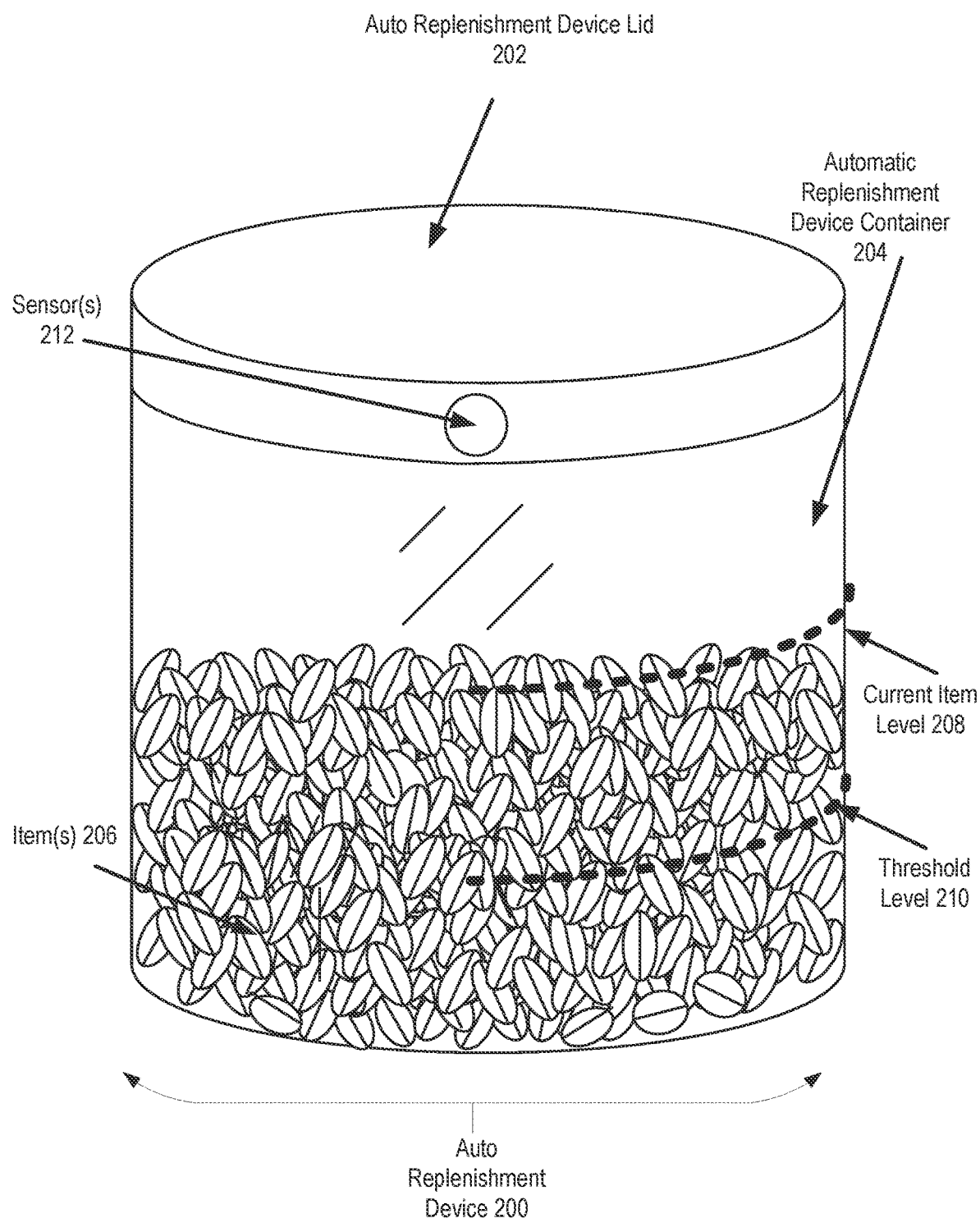
FIG. 2 illustrates an example ARD with items placed within the ARD, in accordance with at least one embodiment.

FIG. 2 illustrates an example ARD 200 with items placed within the ARD, in accordance with at least one embodiment. The ARD 200 is an example of the ARD 104 of FIG. 1 and may include an ARD lid 202, and an ARD container 204. One or more item(s) 206 (e.g., coffee beans) may be stored within the ARD container 204. FIG. 2 also includes visual representations for a current level 208 of the item(s) 206 and a threshold level 210. It should be noted that although the ARD 200 of FIG. 2 includes visual representations of a current level 208 of item and a threshold level 210, these depictions are for clarification of aspects of the embodiments described herein. For example, a current level 208 of item may be determined by service provider computer(s) 102 of FIG. 1 based on sensor data obtained by sensor(s) 212 and maintained in a user profile that is generated and stored by the service provider computer(s) 102. As described herein, the current level 208 may be determined by monitoring the consumption rate that is derived from the sensor data obtained by the sensor(s) 212. The threshold level 210 may be stored and associated with the user profile maintained by the service provider computer(s) 102. The threshold level 210 may be defined for the item(s) 206 based on the type or category of the items or by the user.

It should be noted that the ARD 200 of FIG. 2 represents a container which may be of any shape, depth, or size, in which item(s) 206 are placed within. In embodiments, the ARD 200 may include one or more sensor(s) 212 that may be configured to determine a distance of the item(s) 206 that are currently situated within the ARD container 204 of the ARD 200 (i.e., capture or obtain distance measurements between the one or more sensor(s) 212 and the item(s) 206). The sensor(s) 212 may include a time of flight sensor (e.g., a time of flight camera, a time of flight transmitter and receiver combination, etc.) that is configured to determine/detect a distance/amount of item(s) 206 placed in the ARD container 204 of the ARD 200 based at least in part on the time of flight for a signal to be emitted from the one or more sensor(s) 212 to a current level 208 of the item(s) 206 or to a surface area of the item(s) 206. In accordance with at least one embodiment, the sensor data collected by the one or more sensor(s) 212 may include distance measurements identifying a distance between the item(s) 206 and one or more sensor(s) 212. The sensor data may include the raw data that was obtained by the sensor(s) 212 and/or the sensor data may include values that represent a conversion from the raw data to any suitable format and/or unit of measurement.

The sensor data may indicate a current distance, amount, and/or volume of the item(s) 206 situated within the ARD container 204. For example, the sensor data may indicate a current distance (e.g., 140 mm, 5.5 inches, etc.) between the one or more sensor(s) 212 and the item(s) 206. The sensor data may indicate a current volume of the item(s) (e.g., 57.75 cubic inches, 39.23 cubic inches, etc.) and/or an item number or quantity that indicates a number or quantity of the item(s) 206 situated within the ARD container 204 of ARD 200. The ARD 200 and sensor(s) 212 may be configured to utilize any suitable time of flight signal technology between the sensor(s) 212 and the item(s) 206. In embodiments, the sensor data may include or be accompanied with an item ID, an ARD ID, or an item tag ID. Although the ARD 200 of FIG. 2 includes the sensor(s) 212 within or on a surface of the ARD lid 202, the sensor(s) 212 may be placed on one or more interior surfaces of the ARD container 204. In at least one embodiment, the ARD lid 202 may be configured to be placed on any suitable container (including, for instance, a container of another device such as a coffee grinder for grinding the coffee beans).

Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensor(s) 212 and item(s) 206 (e.g., current level of item 208) utilizing a source/detector or transmitter/receiver. In embodiments, the service provider computers may be configured to determine a distance from the sensor(s) 212 and item(s) 206 (e.g., current level of item 208) using the sensor data obtained by the sensor(s) 212.

For example, the elapsed time period between the transmission of a signal from a source to detection of the signal (e.g., from the sensor(s) 212), or at least a portion thereof, at a detector or receiver, along with the known speed of the signal (e.g., the speed of light) may be utilized to determine the distance between the source of the signal (e.g., sensor(s) 212) and the item(s) 206. The ARD 200 may be configured to transmit the sensor data obtained by sensor(s) 212 to a remote computing device separate from the ARD 200 (e.g., the service provider computer(s) 102 of FIG. 1, a cloud-based server/service, etc.). In some embodiments, the remote computing device may be configured to utilize the sensor data to calculate the distance between the sensor(s) 212 and the current level of item 208 and correlate the distance to a volume, amount, and/or quantity of the item(s) 206 left in the ARD container 204. The sensor data may be used to determine the consumption data or consumption rate of item(s) 206 and in embodiments reorder the item(s) 206 upon the amount of the item being equal to or less than the threshold level 210. The sensor data may be adjusted or corrected for any sensor drift and/or any inaccuracy of the measurements due to the type of the sensors 212 (e.g., for transmissivity when the item(s) 206 may not have a particular light transmissivity property).

Figure 3:
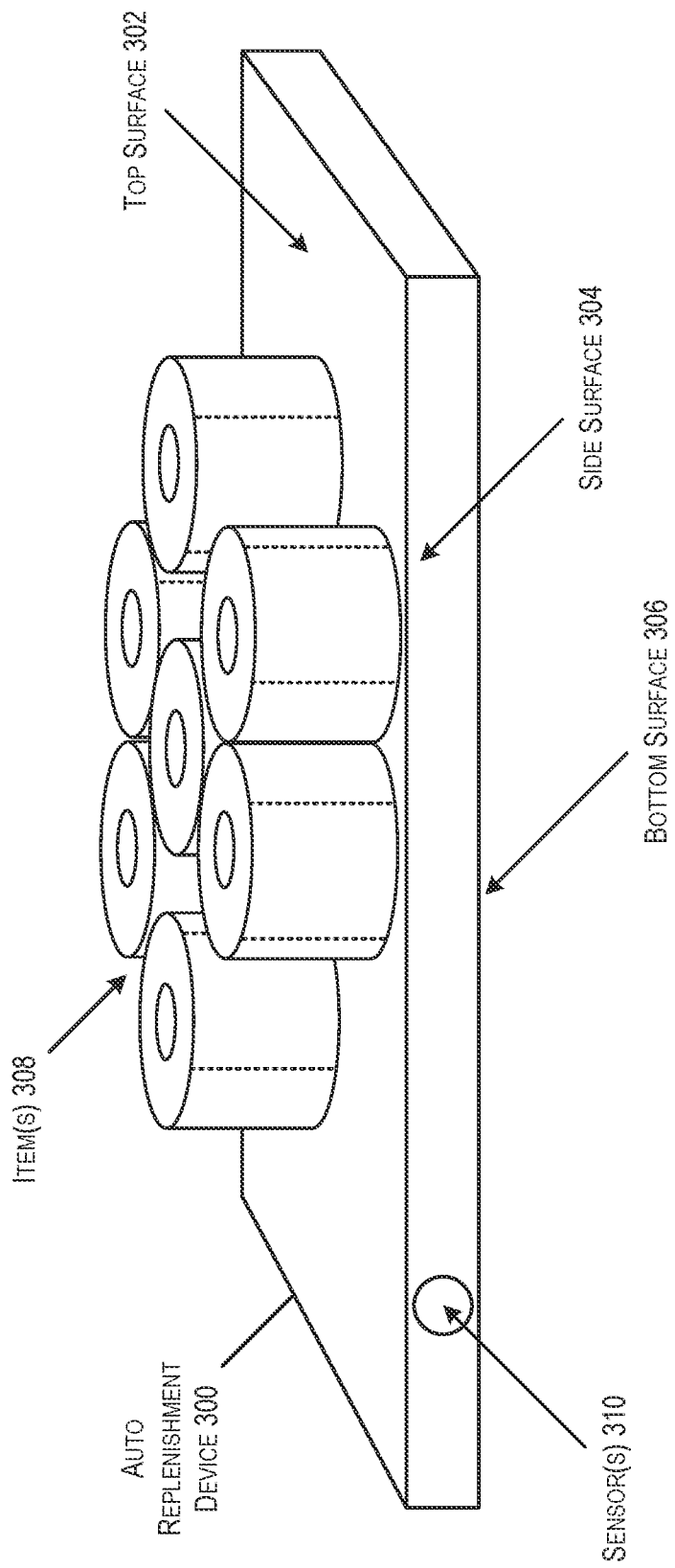
FIG. 3 illustrates an example ARD and items placed on the ARD, in accordance with at least one embodiment.

FIG. 3 illustrates an example ARD 300 and items placed on the ARD 300, in accordance with at least one embodiment. The ARD 300 may be an example of the ARD 104 from FIG. 1. As illustrated, the ARD 300 which may have a top surface 302, a side surface 304, and a bottom surface 306. One or more items 308 (e.g., toilette papers) may be placed on the top surface 302 of the ARD 300. The bottom surface 306 may be in contact with a flat or substantially flat surface, such as a counter, table, or shelf. It should be noted that although the ARD 300 of FIG. 3 represents a shelf which may be of any shape, depth, or size, the ARD 300 may be a mat or pad in which items 308 are placed thereon. In embodiments, the ARD 300 may include one or more sensor(s) 310. The sensors 310 may be configured to determine a weight of the items 308 that are currently placed on the top surface 302 of the ARD 300 (e.g., capture or obtain weight measurements of the items 308). The sensors 310 may include a weight sensor (e.g., a load sensor, a strain gauge on a load cell, etc.) that is configured to determine/detect a weight/mass of items 308 placed on the top surface 302 of the ARD 300. In accordance with at least one embodiment, the weight of the items 308 (e.g., sensor data, weight measurements, or property measurements) may include the raw data that was obtained by the sensors 310 and ARD 300 that represents a current weight/mass of the items 308 that are situated on the top surface 302 of ARD 300. The weight measurements may indicate a current weight/mass of the items 308, item volume data that indicates a current volume of the items 308, and/or item number/quantity data that indicates a number or quantity of the items 308 situated on the reorder device 300. In embodiments, the sensor data may include or be accompanied with an item ID, an ARD ID, or an item tag ID. Further description of the ARD 300 is available in U.S. patent application Ser. No. 15/696,040 filed Sep. 5, 2017 entitled "SENSOR DATA-BASED REORDERING OF ITEMS" of which the full disclosure is incorporated herein by reference.

As described herein, the ARD 300 may be configured to transmit, via available networks, the weight measurements or other data captured by sensors 310 about items 308 to a service provider computer implementing an automatic replenishment engine. In accordance with at least one embodiment, the weight measurements may be utilized by the service provider computers to determine a consumption rate of a user associated with ARD 300 of the items 308. The consumption rate may be utilized to order a replacement amount of the items 208 (e.g., additional rolls of the toilette paper) and to select an optimal delivery method.

Figure 4:
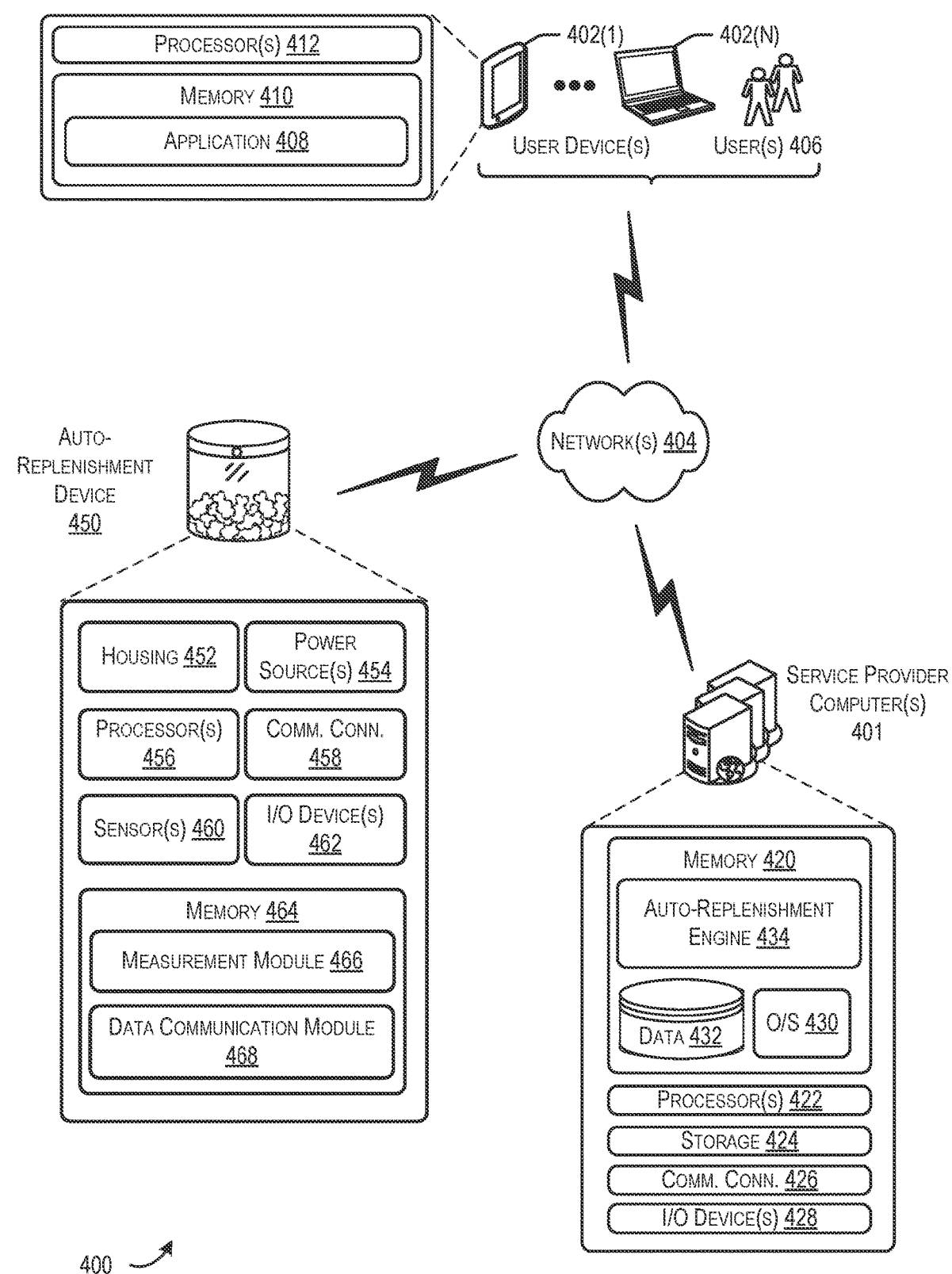
FIG. 4 illustrates an example computer network architecture for selecting a delivery method based on sensor data of an ARD, in accordance with at least one embodiment.

FIG. 4 illustrates an example computer network architecture 400 for selecting a delivery method based on sensor data of an ARD, in accordance with at least one embodiment. As illustrated, the computer network architecture 400 may include one or more service provider computers 401 (e.g., the service provider computer(s) 102 of FIG. 1), one or more user devices 402 (e.g., the user device 106 of FIG. 1), and/or an ARD 450 (e.g., the ARD 104 of FIG. 1) connected via one or more networks 404. One or more users 406 (e.g., customers, users, consumers, etc.,) may utilize user computing devices 402(1)-(N) (collectively, the user devices 402) to access application 408 (e.g., a browser application, a shopping application, etc.) or a user interface (UI) accessible through the application 408. In embodiments, the user devices 402 may include one or more components for enabling the user(s) 406 to interact with the application 408.

The user devices 402 may include at least one memory 410 and one or more processing units or processor(s) 412. The memory 410 may store program instructions that are loadable and executable on the processor(s) 412, as well as data generated during the execution of these programs. Depending on the configuration and type of the user devices 402, the memory 410 may be volatile (such as random access memory (RAM)) and/or non-volatile (such as read-only memory (ROM), flash memory, etc.). The user devices 402 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 402. In some implementations, the memory 410 may include multiple different types of memory, such as static random access memory (SRAM), dynamic random access memory (DRAM), or ROM.

Turning to the contents of the memory 410 in more detail, the memory 410 may include an operating system and one or more application programs or services for implementing the features disclosed herein. Additionally, the memory 410 may include one or more modules for implementing the features described herein including the automatic replenishment module 414.

The architecture 400 may also include one or more service provider computers 401 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 401 may implement or be an example of the service provider computer(s) described herein. The one or more service provider computers 401 may also be operable to provide site hosting, media streaming services, computer application development, and/or implementation platforms, combinations of the foregoing, or the like to the one or more users 406 via user devices 402.

In some examples, the networks 404 may include any one or a combination of many different types of networks, such as cable networks, the Internet, wireless networks, cellular networks, and other private and/or public networks. While the illustrated examples represent the users 406 communicating with the service provider computers 401 over the networks 404, the described techniques may equally apply in instances where the users 406 interact with the one or more service provider computers 401 via the one or more user devices 402 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 401 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 401 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 401 may be in communication with the user devices 402 and/or the ARD 450 via the networks 404, or via other network connections. The one or more service provider computers 401 may include one or more servers, perhaps arranged in a cluster or as individual servers not associated with one another.

In one illustrative configuration, the one or more service provider computers 401 may include at least one memory 420 and one or more processing units or processor(s) 422. The processor(s) 422 may be implemented as appropriate in hardware, computer-executable instructions, firmware, or combination thereof. Computer-executable instruction or firmware implementations of the processor(s) 422 may include computer-executable or machine-executable instructions written in any suitable programming language to perform the various functions described when executed by a hardware computing device, such as a processor. The memory 420 may store program instructions that are loadable and executable on the processor(s) 422, as well as data generated during the execution of these programs. Depending on the configuration and type of the one or more service provider computers 401, the memory 420 may be volatile (such as RAM) and/or non-volatile (such as ROM, flash memory, etc.). The one or more service provider computers 401 or servers may also include additional storage 424, which may include removable storage and/or non-removable storage. The additional storage 424 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 420 may include multiple different types of memory, such as SRAM, DRAM, or ROM.

The memory 420, the additional storage 424, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 420 and the additional storage 424 are all examples of non-transitory computer storage media. Additional types of non-transitory computer storage media that may be present in the one or more service provider computers 401 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 401. Combinations of any of the above should also be included within the scope of non-transitory computer-readable media.

The one or more service provider computers 401 may also contain communication connection interface(s) 426 that allow the one or more service provider computers 401 to communicate with a data store, another computing device or server, user terminals, and/or other devices on the networks 404. The one or more service provider computers 401 may also include I/O device(s) 428, such as a keyboard, a mouse, a pen, a voice input device, a touch input device, a display, speakers, a printer, etc.

Turning to the contents of the memory 420 in more detail, the memory 420 may include an operating system 430, one or more data stores 432, and/or one or more application programs or services for implementing the features disclosed herein including the automatic replenishment engine 434 (e.g., an example of the automatic replenishment engine 118 of FIG. 1). In accordance with at least one embodiment, the automatic replenishment engine 434 may be configured to maintain a user profile associated with a user, determine a current amount of an item stored by the ARD 450, determine a consumption rate of the item, select an optimal delivery for delivering a replacement amount of the item, or the like.

The architecture 400 also includes the ARD 450. As disclosed herein, the ARD 450 may be configured, among other things, to utilize sensor(s) 460 to obtain sensor data associated with items situated within or on the ARD 450 (e.g., in a container or on a surface of the ARD 450 as described in connection with FIGS. 2 and 3).

The ARD 450 (or a portion of the ARD 450 such as the ARD lid 202 of FIG. 2) may include a housing 452 that may include components of ARD 450 discussed further below. In embodiments, the housing 452 may be composed of any type of material (e.g., plastic, metal, etc.), and may serve to prevent the components of the ARD 450 from being damaged or interacting or otherwise contaminating the items placed within ARD 450.

The ARD 450 may include one or more power source(s) 454 that provide power to one or more components of the ARD 450. The power source(s) 454 may include a battery, which may include a one-time use battery or a rechargeable battery. However, the power source(s) 454 may rely on power from another source providing alternating current (AC) power and may be a power inverter. For example, the ARD may be powered via a power cord that is coupled to the ARD 450 and that is detachably connected to a power outlet, such as a wall outlet. In some embodiments, the ARD 450 may include a power level detector that is configured to determine and display a power level for the ARD 450 using alpha-numeric characters that indicate a current power level of a battery of the ARD 450 and power source(s) 454. The power level may be transmitted by the ARD 450 to a remote computing device (e.g., the service provider computer(s) 102 of FIG. 1), which may track the power level of the power source(s) 454 over time. In some embodiments, the ARD 450 and/or the remote computing device may provide a notification (e.g., to a client device not pictured) of the power level via any suitable means such an e-mail message, a text message, a mobile application, a website, etc.

The ARD 450 may include at least one memory (e.g., memory 464) and one or more processing units (e.g., processor(s) 456). The processor(s) 456 may be implemented as appropriate in hardware. Computer-executable instructions, software or firmware implementations of the processor(s) 456 may include computer-executable or machine-executable instructions written in any suitable programming language to perform the various functions described.

The memory 464 may include more than one memory and may be distributed throughout the ARD 450. The memory 464 may store program instructions (e.g., related to a measurement module 466 and/or a data communication module 468) that are loadable and executable on the processor(s) 456, as well as data generated during the execution of these programs. Depending on the configuration and type of memory, the memory 464 may be volatile (such as random access memory (RAM)) and/or non-volatile (such as read-only memory (ROM), flash memory, or other memory). In some implementations, the memory 464 may include multiple different types of memory, such as static random access memory (SRAM), dynamic random access memory (DRAM), or ROM.

Turning to the contents of the memory 464 in more detail, the memory 464 may include one or more application programs, modules or services for implementing the features disclosed herein including measurement module 466 and/or the data communication module 468. The measurement module 466 may include instructions that, when executed by the processor(s) 456 may cause sensor(s) 460 of the ARD 450 to capture sensor data including distance measurements and/or weight measurements associated with the items placed on, or within, the ARD 450. A distance measurement may quantify a distance between the sensor(s) 460 and the item on/within the ARD 450. The memory 464 may be configured to store the collected sensor data. In some embodiments, the measurement module 466 may be configured to convert raw sensor data into any suitable format and/or unit. The measurement module 466 may be configured to provide sensor data and/or converted sensor data to the data communications module 468.

In some embodiments, the data communication module 468 may include instructions that, when executed by the processor(s) 456, transmit and receive data via communication connection(s) 458. The communication connection(s) 458 may include suitable communication interfaces for communicating via Bluetooth (Bluetooth Low Energy (BLE)), WiFi, a cellular connection (e.g., 3G, 4G, LTE, etc.). The communication connection(s) 458 may be configured to transmit the data to a remote computing device (e.g., the service provider computer(s) 401) or relay data to the remote computing device using a proxy device (e.g., a smartphone, a laptop, a desktop computer, or any suitable device capable of performing data transfers with the remote computing device). The communication connection(s) 458 any may utilize known or widely used communication protocols such as a wireless connection (WiFi network), a wired connection to a network, cellular network, short-range or near-field networks (e.g., Bluetooth), infrared signals, local area networks, wide area networks, the Internet, etc.

In at least one embodiment, the data communication module 468 may be configured to obtain sensor data from the measurement module 466 and/or the memory 464. The data communication module 468 may be responsible for transmitting such sensor data to a remote computing device (e.g., the service provider computer(s) 102) according to any suitable communications protocol. The sensor data may be communicated in any manner, such as via Bluetooth (Bluetooth Low Energy (BLE) may also be considered when using the term "Bluetooth"), WiFi, a cellular connection (e.g., 3G, 4G, LTE, etc.), and so on.

In at least one embodiment, the data communication module 468 may be configured to receive data via the communication connection(s) 458. For example, the data communication module 468 may be configured to receive item information (e.g., an item identifier, unit weight, material consistency, or any suitable attribute of an item) indicating an item that is placed on or within the ARD 450. In some embodiments, the item information or other suitable information communicated to the data communication module 468 may include/indicate conversion algorithms for converting raw sensor data into a particular format and/or unit. In still further embodiments, the data communication module 468 may be configured to receive any suitable information for instructing the measurement module 466 in a manner of collecting sensor data utilizing sensor(s) 460. By way of example, an instruction may be received by the data communication module 468 and communicated to the measurement module 466 that indicates that sensor data is to be collected according to a provided schedule, at a particular periodic rate, or the like. Generally, any suitable data that is to be transmitted or received by the ARD 450 may be processed by the data communication module 468 and provided to any other module and/or component of the ARD 450.

The ARD 450 may include sensor(s) 460 such as a time of flight sensor, or other suitable sensors such as time of flight camera sensors, scale sensors, or infrared sensors that are configured to obtain or capture sensor data of items placed on and/or within the ARD 450. The time of flight sensors may include signal transmitters and receivers that are configured to determine an amount, quantity, and/or volume of an item stored on and/or within the ARD 450 or calculate a distance from the source of the signal to the receptor of the signal which can be converted into an amount of the item stored on and/or within the ARD 450.

The sensor(s) 460 may be configured to periodically obtain sensor data regarding the items placed on or within the ARD 450 at predetermined intervals, such as every day, every twelve hours, every six hours, every hour, every fifteen minutes, and so on. In some embodiments, the sensor(s) 460 may determine/sense when an item is placed on or within the ARD 450, which may cause the sensor(s) 460 to obtain sensor data associated with the item(s). The sensor(s) 460 may also be instructed (e.g., by the measurement module 466) to obtain sensor data via instructions initiated at a remote computing device (e.g., the service provider computer(s) 102). The frequency of sensor data collection performed by the sensor(s) 460 may be adjusted over time, which may be based on the rate of consumption of the items and/or the manner in which the ARD 450 is being powered. For instance, if the ARD 450 is being powered via a power cord and power outlet, the sensor data may be obtained more frequently (e.g., every hour, every fifteen minutes, etc.). However, if the ARD 450 is being powered using a battery, the sensor data may be collected less frequently to conserve battery life.

The ARD 450 may also include input/output (I/O) device(s) 462 and/or ports, such as for enabling connection with a keyboard, a mouse, a pen, a voice input device, a touch input device, a display, speakers, a printer, or other I/O device. The I/O device(s) 462 may be in any suitable form to enable data to be provided to any suitable component of the ARD 450 and/or for presenting information (e.g., text, lights, sounds) at the ARD 450 (e.g., via speaker, a display, haptic feedback, etc.).

Figure 5:
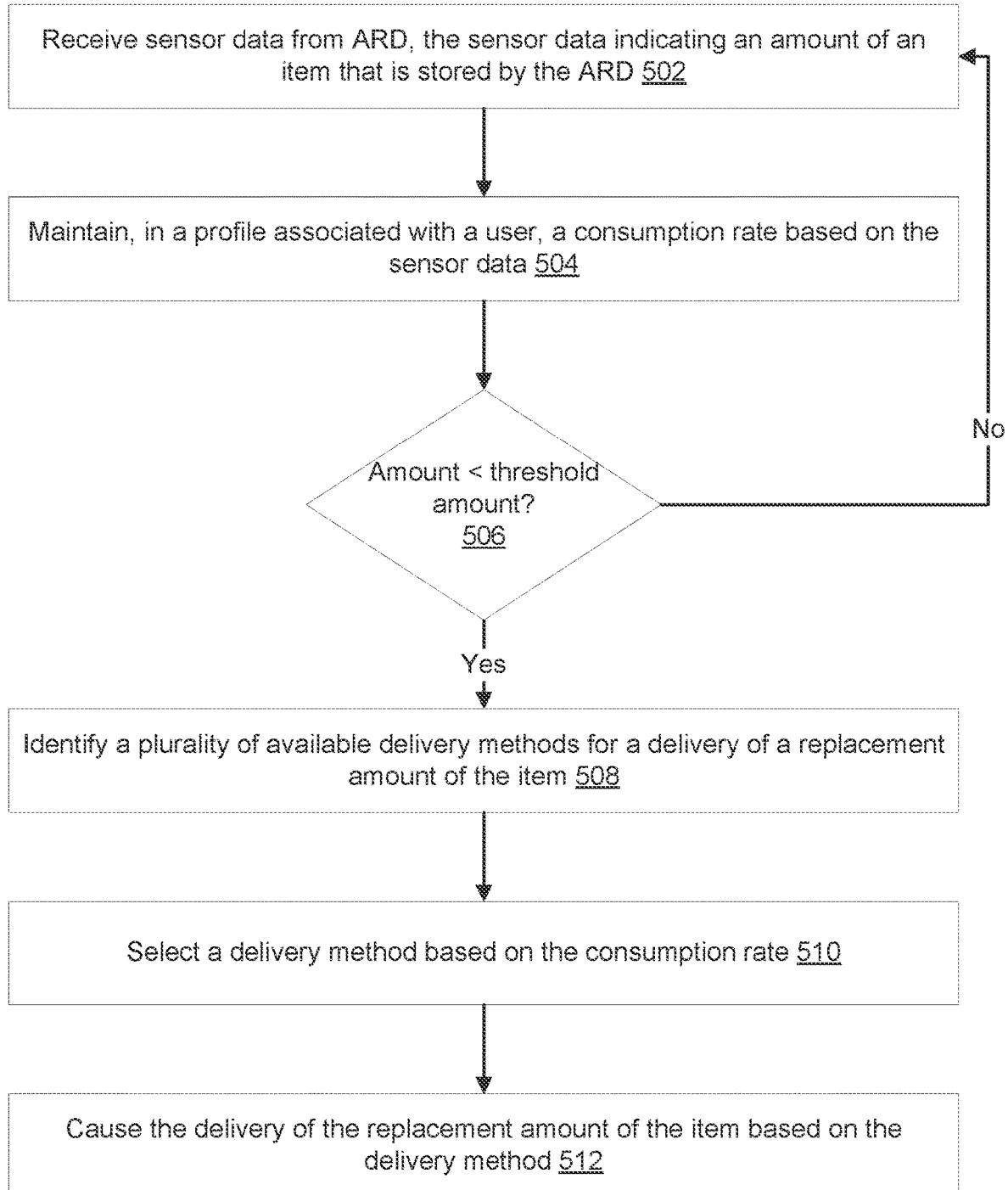
FIG. 5 illustrates an example end-to-end flow for selecting a delivery method based on sensor data of an ARD, in accordance with at least one embodiment.
Figure 6:
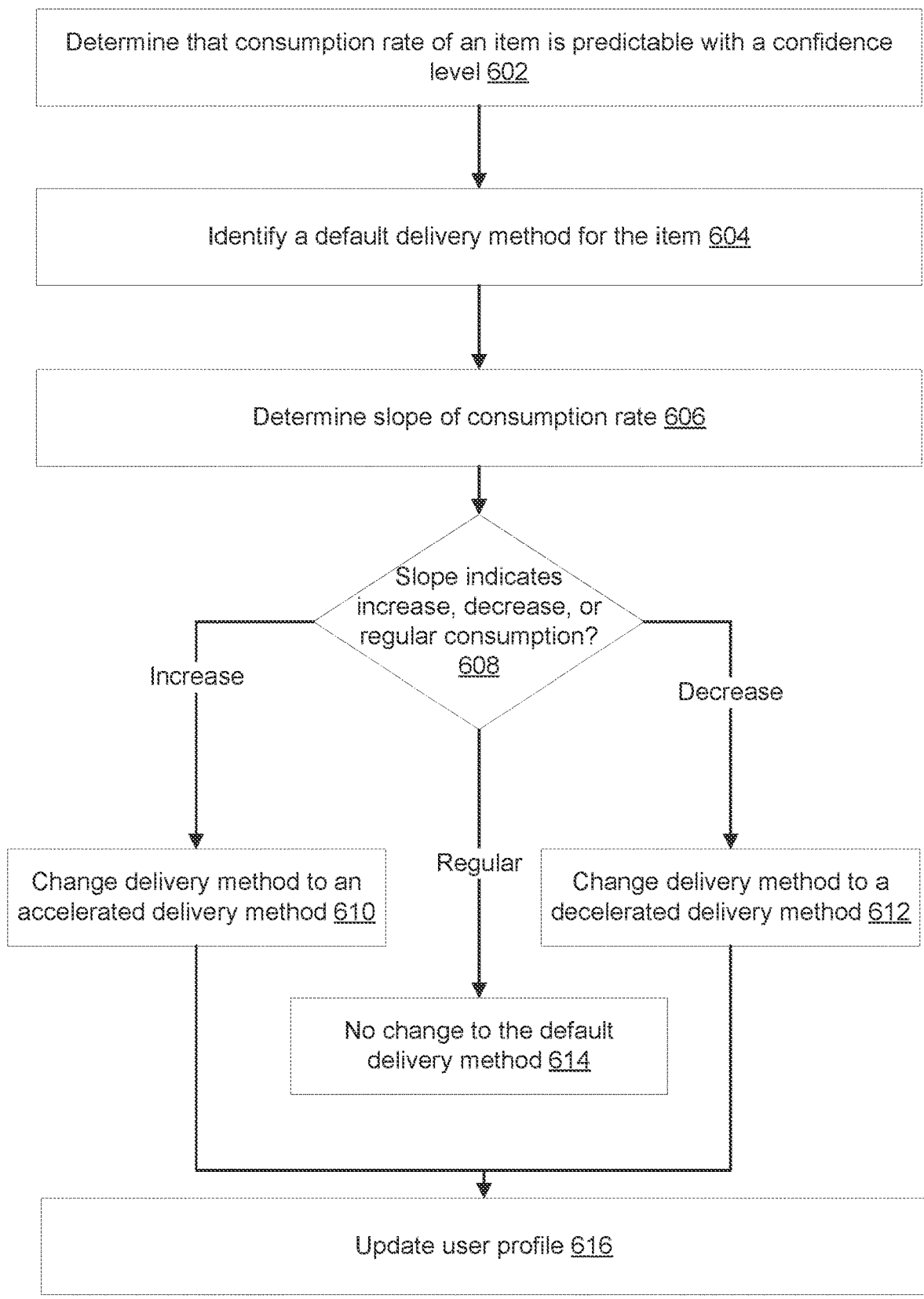
FIG. 6 illustrates an example detailed flow for selecting a delivery method based on sensor data of an ARD of a user, in accordance with at least one embodiment.

FIGS. 5-7 illustrate examples of flows for selecting a delivery method based on sensor data of an ARD. A computer system hosting an automatic replenishment engine, such as the server provider computer(s) 401 of FIG. 4, may be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered. Further, some of the operations are similar between the flows. In the interest of brevity, the similarities are not repeated.

FIG. 5 illustrates an example end-to-end flow for selecting a delivery method based on sensor data of an ARD of a user, in accordance with at least one embodiment. The example flow may start at operation 502, where the computer system may receive sensor data from the ARD. The sensor data may indicate an amount of an item that is stored by the ARD and may be generated by one or more sensors of the ARD. In an example, the sensor data may include weight data generated by a weight sensor of the ARD. The weight data may indicate a current weight of the amount of the item. In another example, the sensor data may include distance data measured by an optical sensor. The distance data may indicate a current fill level of the amount of the item within a container of the ARD. In both examples, the sensor data may be raw data received by the computer system in conjunction with an identifier(s) of the ARD (e.g., an ARD ID), user profile (e.g., a user ID), and/or item (e.g., an item ID). The sensor data and identifier(s) may be transmitted from the ARD to the computer system at time intervals, on demand, and/or upon a user selection.

At operation 504, the computer system may maintain, in a profile associated with a user of the ARD (e.g., a user profile or a device profile), a consumption rate based on the sensor data. In an example, the computer system may identify the profile based on the identifier received with the sensor data. The profile may store the sensor data received over time based on the transmissions from the ARD and may associate this stored data with the item. The profile may also store a user location associated with the ARD and/or the user. The computer system may estimate the amount of the item stored by the ARD over time from the sensor data and may generate a curve that represents this amount over time. For instance, the computer system may determine, from the sensor data, a measurable property of the item indicating the amount remaining in storage of the ARD (e.g., weight from weight data or fill level from distance data) and may track this measurable property (e.g., changes to the weight, changes to the fill level) over time. The computer system may store the consumption rate as a curve in the profile and may associate this curve with the item (e.g., by tagging the curve with the item ID).

At operation 506, the computer system may determine whether the amount of the item stored by the ARD is less than a threshold amount based on the consumption rate. In an example, the profile may store the threshold amount for the item. This threshold amount may be defined based on user input or based on input of a provider of the ARD and/or the item. The computer system may determine the current amount of the item available from the ARD based on the latest received sensor data (or, similarly, based on the latest update to the consumption rate given the latest sensor data). The current amount may be determined as a function of weight from weight data and/or volume (or, similarly, fill level) from distance data. The computer system may compare the current amount to the threshold amount (e.g., a weight threshold and/or a fill level threshold). If smaller than the threshold amount, operation 508 may be performed by which the computer system may initiate the replenishment process. Otherwise, the computer system may loop back to operation 502 to receive additional sensor data from the next transmission of the ARD and continuously update the consumption rate in the profile and track the consumption of the amount of the item stored by the ARD.

At operation 508, the computer system may identify a plurality of available delivery methods for a delivery of a replacement amount of the item. At this operation, the computer system may have determined that the amount of the item stored by the ARD is currently less than the threshold amount and, thus, triggering the replenishment of the item. Information about the available delivery methods (e.g., identifiers of these methods, their delivery time frames, their costs, source location per delivery method, etc.) may be stored in the profile or in a remote database and the storage may be associated with the item ID. The computer system may use the item ID to search for and identify the delivery methods.

At operation 510, the computer system may select a delivery method from the plurality of available delivery methods based on the consumption rate. In an example, the computer system may use multiple selection factors to select the optimal delivery method (e.g., the method out of the available ones that best matches the selection factors). One selection factor may relate to timing of the delivery of the replacement item. For instance, the computer system may predict a run-out-date of an amount of the item stored by the ARD based on the slope of the consumption rate's curve and the current estimated amount. The timing factor may be used to filter out delivery methods that would deliver the replacement amount in a time frame past the run-out-date. Another selection factor may relate to delivery cost. For instance, out of the remaining (not filtered out) delivery methods, the computer system may select the most cost effective delivery method (e.g., the method that would deliver the replacement amount before the run-out-date at the least cost out of the remaining methods; the cost may be expressed along one or more dimensions including an economic cost, a number and bandwidth of delivery resources that should be allocated to execute the delivery method, and the like).

At operation 512, the computer system may cause the delivery of the replacement amount of the item to the user location based on the delivery method. In an example, the computer system may generate a purchase order for the replacement amount and delivery instructions identifying the selected delivery method, the item, and the applicable delivery time frame. The purchase order may be used by a back-end system to obtain the item from storage in a fulfilment facility. The delivery instructions may be used by the back-end system to allocate delivery resources and schedule the delivery of the replacement amount from the fulfilment facility to the user location. In this way, the sensor data transmitted by the ARD may be used by the computer system to generate new data (e.g., the consumption rate) that is then used for the optimization and management of the delivery resources for the delivery of the replacement item. In addition, the computer system may identify a user device or an electronic address of the user from the profile. The computer system may send a notification about an initiation of the delivery to the user device and/or to the electronic address.

FIG. 6 illustrates an example detailed flow for selecting a delivery method based on sensor data of the ARD, in accordance with at least one embodiment. In this example, a default delivery may be specified in the user profile (or, similarly, in a device profile or any other type of profile) for the replacement amount of the item and may be used when the consumption rate indicates a regular consumption. However, if the consumption range indicates a deviation from the regular consumption, a more optimal delivery method is selected based on the actual consumption.

The example flow may start at operation 602, where the computer system may determine that the consumption rate of item by the user (e.g., the consumption rate of the amount of the item stored by the ARD) is predictable with a confidence level. In an example, only when the consumption rate is predicted with the confidence level may the computer system optimize the delivery method. If the consumption rate is unpredictable (e.g., the confidence level is below the threshold indicating that there is much fluctuation in the consumption rate), the computer system may forego the example flow of FIG. 6.

Multiple confidence factors may be used to determine the confidence level. In an example, a confidence factor relates to the sensor data. In particular, if the sensor data can be accurately measured and indicates a stable consumption rate (e.g., a curve with a uniform slope or with a number of changes to the slope that is less than a threshold number), the computer system may determine that the consumption rate is predictable at a high confidence level (e.g., one exceeding the confidence threshold). In another example, a confidence factor may relate to historical consumption rate of the item or other items by the user of the ARD. For example, the user profile may store historical data about past notifications about deliveries of replacement amounts of the item (and, similarly of other items). Each of these notifications may include an option to cancel or postpone the delivery. If the rate of selecting that option is smaller than a selection threshold (e.g., less than five percent of the time), the computer system may determine that the consumption rate is predictable at a high confidence level. In yet another example, a confidence factor may relate to the historical consumption rate of the item or the type of the item by other users. For example, the computer system may determine, from multiple user profiles, the selection rates of the option to cancel or postpone replacement deliveries specifically to the item or to the type of the item. The selection rates may be average to generate an average selection rate that the computer system may compare to the selection threshold and, accordingly, determine whether the confidence level is high (e.g., exceeds the selection threshold).

At this operation, the computer system may also generate the actual consumption rate of the item by the user based on the sensor data received from the ARD specifically for the user, similarly to the estimation described in connection with the example flow of FIG. 5. Further, the system may generate an additional consumption rate(s) based on the historical consumption rate(s) of the user and/or of other users. For instance, if the confidence level of the actual consumption rate is low for a reason (e.g., not enough amount of sensor data, accuracy of the sensor data is low, etc.), the computer system may turn to the historical consumption rate of the user for another item of the same type and/or the historical consumption rate of other users for the same item or for items of the same type. Each of the historical consumption rates and the actual consumption rate may be associated with a weight stored in the user profile. For example, the weights may change over time and may be expressed as a function (e.g., the inverse) of the corresponding confidence levels. The computer system may generate a consumption rate of the item by the user by weighing the actual consumption rate and the historical consumption rate(s) according to the weights and combining (e.g., summing and normalizing) these weighted consumption rates. In turn, this generated consumption rate may be associated with a confidence level (e.g., as a function of the corresponding confidence levels) and if that confidence level exceeds the confidence threshold, the computer system may proceed with the example flow of FIG. 6.

At operation 604, the computer system may identify a default delivery method for the item. In an example, information about the default delivery method may be stored in the user profile and may identify this delivery method and the associated delivery time frame. The user profile may also associate the default delivery method with a regular consumption rate of the item (e.g., by tagging the default delivery method with an identifier of the regular consumption rate). This regular consumption rate may describe a regular consumption of the item (e.g., may show a consumption curve about how the amount of item is typically consumed over time) and may be generated based on the historical consumption rates by other users of the item or of items of the same type. In this way, the regular consumption rate may represent a model of the regular consumption and may be used as a benchmark against which the consumption rate of the item by the user is measured.

At operation 606, the computer system may determine a slope of the consumption rate of the item by the user. For example, the computer system may track how the curve of the consumption rate changes over time. Changes in the curve may indicate the slope of the consumption rate.

At operation 608, the computer system may determine whether the slope indicates an increase, decrease, or regular consumption of the item by the user. For example, once the estimated amount of the item based on the latest sensor data indicates that this amount is less than the threshold amount, the computer system may consider the slope of the consumption rate at that point in time. The computer system may compare this slope to the slope of the regular consumption rate around the threshold amount to identify any deviation. If the deviation indicates that the slope of the consumption rate is larger than that of the regular consumption rate, the computer system may determine that the consumption by the user is faster than the regular consumption (e.g., a relative increase) and may perform operation 610 to select an accelerated delivery method relative to the default delivery method. If the deviation indicates that the slope of the consumption rate is smaller than that of the regular consumption rate, the computer system may determine that the consumption by the user is slower than the regular consumption (e.g., a relative decrease) and may perform operation 612 to select a decelerated delivery method relative to the default delivery method. If the deviation indicates that the slope of the consumption rate is relatively similar to that of the regular consumption rate, the computer system may determine that the consumption by the user is also regular and may perform operation 614, whereby the computer system may not change the default delivery method.

At operation 610, the computer system may change the selected delivery method from the default delivery method to the accelerated delivery method based on a determination at operation 608 that the slope indicates an increase in the consumption of the amount of the item. In an example, various selection factors may be used including timing and cost factors for selecting the accelerated delivery method, similarly to what is described in connection with the example flow of FIG. 5. The accelerated delivery method may have a shorter delivery time frame than the default delivery method. The computer system may store information about the switch to the accelerated delivery method in the user profile.

At operation 612, the computer system may change the selected delivery method from the default delivery method to the decelerated delivery method based on a determination at operation 608 that the slope indicates a decrease in the consumption of the amount of the item. In an example, various selection factors may be used including timing and cost factors for selecting the decelerated delivery method, similarly to what is described in connection with the example flow of FIG. 5. The decelerated delivery method may have a longer delivery time frame than the default delivery method. The computer system may store information about the switch to the decelerated delivery method in the user profile.

At operation 614, the computer system may maintain the default delivery method as the selected delivery method based on a determination at operation 608 that the slope indicates a regular consumption of the amount of the item. The computer system may store information about this decision not to change the default delivery method in the user profile.

At operation 616, the computer system may update the user profile. As described above in connection with operations 610-614, the computer system may store, in the user profile, information about the switch to the accelerated or decelerated method or about the decision to maintain usage of the default delivery method. In addition, if there is a switch from the default delivery method, the computer system may send a notification about an initiation of the accelerated or decelerated delivery method to the user device and/or to the user's electronic address.

FIG. 7 illustrates an example detailed flow for selecting a second delivery method after an initiation of a first delivery method based on sensor data of the ARD indicating a change to the consumption rate after the initiation, in accordance with at least one embodiment. In this example, the first delivery method may have been selected based on the consumption rate as described in connection with FIGS. 5 and 6. However, subsequent sensor data received from the ARD may indicate a significant change to the consumption rate of the item by the item (e.g., a sudden spike in the consumed amount). Based on this change, if the user may run out of the item prior to the delivery of the first replacement amount using the first delivery method, a second replacement amount may be shipped with the second delivery method, where this second delivery method is relative faster than the first one. In this way, the user may receive the second replacement amount prior to the run-out-date.

The example flow of FIG. 7 may start at operation 702, where the computer system may update the consumption rate of the item by the user (e.g., the amount of the item stored by the ARD) based on additional sensor data received from the ARD after an initiation of a delivery of a first replacement amount of the item. This delivery may rely on a first delivery method selected by the computer system as described in connection with FIGS. 5 and 6. In an example, the computer system may keep monitoring and updating the consumption rate after the initiation of the delivery by receiving the additional sensor data from the ARD.

At operation 704, the computer system may determine, based on the updated consumption rate, that the amount of the item stored by the ARD will be depleted prior to a completion of the delivery of the first replacement amount. For example, the first delivery method may be associated with a first delivery time frame, which may be stored in the user profile. The computer system may predict an updated run-out-date from the updated consumption rate. The trigger to this prediction may be a significant change to the slope of the curve of the consumption rate (e.g., significant change may be defined as a change in the slope that exceeds a predefined threshold). If the updated run-out-date occurs prior to the first delivery time frame, the computer system may predict the depletion prior to the completion of the delivery of the first replacement amount.

At operation 706, the computer system may select a second delivery method that is faster than the first delivery method. In an example, the second delivery method may be used to deliver a second replacement amount of the item prior to the updated run-out-date. Multiple selection factors may be used to select this accelerated second delivery method, including timing and cost factors similar to what is described in connection with FIGS. 5 and 6. Further, multiple amount factors may be used to select the second amount. In an example, an amount factor may be depend on a replacement strategy. For instance, a strategy may be to deliver a full replacement amount (e.g., equal or larger than the capacity storage capacity of the ARD). Accordingly, the second replacement amount may be the same as the first replacement amount and may equal the full replacement amount. Another strategy may be to deliver a gap amount until the first replacement amount is delivered. Under this strategy, the computer system may determine the duration before the second delivery time frame and the first delivery time frame, and based on the updated consumption rate (e.g., its updated slope) or a historical regular consumption date, may estimate the amount that will be consumed during that duration. The computer system may set the second replacement amount to be equal or substantially equal (e.g., with a ten percent margin) of that estimated amount. In this way, the replacement amount may likely be consumed just in time for the delivery of the first replacement amount.

At operation 708, the computer system may send a notification about the second delivery. For example, the computer system may send the notification about an initiation of the second delivery method to the user device and/or to the user's electronic address. The notification may provide various options for accepting, canceling, or postponing the delivery of the first replacement amount and/or the second replacement amount. For instance, the notification as presented on a user interface of the user device, may include a selectable option to accept or cancel delivery of the second replacement amount. If the second replacement amount is the full replacement amount, the notification as presented on the user interface, may further include a selectable option to accept, cancel, and/or postpone the delivery of the first replacement amount.

At operation 710, the computer system may update the first delivery based on the second delivery. For example, if a user selection of a selectable option(s) from the notification is received, the computer system may manage the first delivery accordingly. In particular, if the user selection indicates a cancelation or a postponement of the first delivery, the computer system may generate delivery instructions to re-route the first delivery from the user location to a new destination (e.g., to another user who has an ARD storing the item or who needs the first replenishment amount, or to the closest fulfilment center given a current location of the first replacement amount). In another example, if the user selection indicates the cancelation of the first delivery, the computer system may send a return notification (e.g., printable return label) to the user device and/or the user's electronic address or may send a return container (e.g., a labeled delivery package) with the second replacement amount. The return container may be used by the user to return the first replacement amount when received. Information about the update(s) to the first delivery method may be distributed to the back-end system to manage the allocation of the delivery resources.

Figure 8:
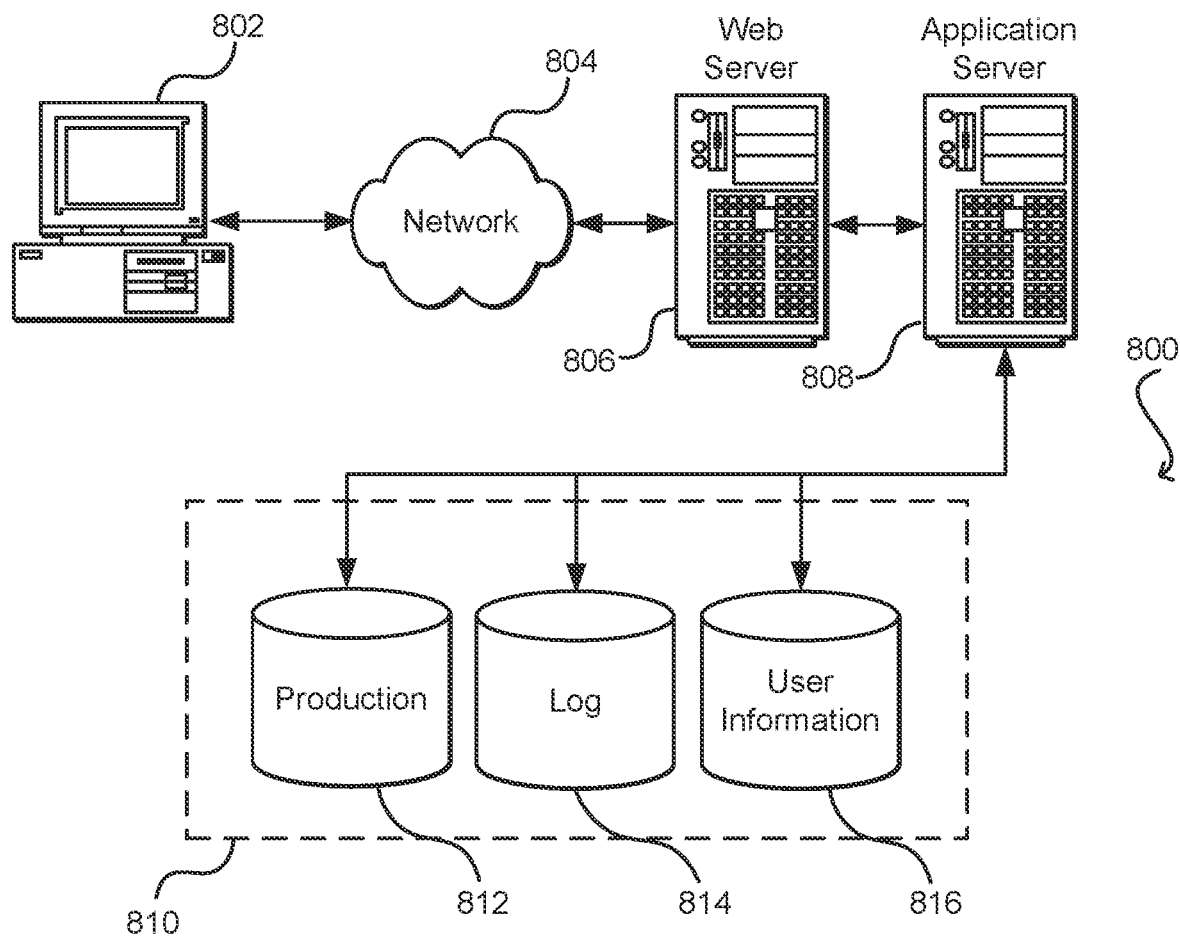
FIG. 8 illustrates aspects of an example environment for implementing aspects in accordance with various embodiments.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    an automatic replenishing device (ARD) comprising a sensor; and
    a computer system communicatively coupled with the ARD and comprising one or more processors and one or more memory, the one or more memory storing instructions that, upon execution by the one or more processors, configure the computer system to:
        receive, from the ARD, sensor data generated by the sensor and indicating an amount of an item stored by the ARD, the sensor data being generated or received at a data collection frequency that is based at least in part on a consumption rate of the item and a power source of the ARD;
        store, based at least in part on the sensor data, consumption data indicating the consumption rate;
        determine a plurality of available delivery methods for a delivery of a replacement amount of the item;
        select a delivery method from the plurality of available delivery methods based at least in part on the consumption rate;
        generate an indication that the delivery method is to be used for the delivery of the replacement amount of the item;
        receive, from the ARD, additional sensor data, indicating an updated amount of the item, the additional sensor data being received at a larger data collection frequency based at least in part on the updated amount being smaller than the amount of the item stored by the device; and
        determining an updated consumption rate based at least in part on the additional sensor data.

2. The system of claim 1, wherein the execution of the instructions further configures the computer system to:
    determine, based at least in part on the additional sensor data, that the amount of the item stored by the ARD will be depleted prior to a completion of the delivery, wherein the additional sensor data is received after initiation of the delivery;
    select a different delivery method from the plurality of available delivery methods; and
    cause a second delivery of a second replacement amount of the item based at least in part on the different delivery method.

3. The system of claim 2, wherein the execution of the instructions further configures the computer system to:
    determine, based at least in part on the additional sensor data, that the consumption rate has decreased, wherein the additional sensor data is received after the delivery method is selected;
    select a different delivery method from the plurality of available delivery methods; and
    generate another indication that the different delivery method is to be used to deliver the replacement amount.

4. The system of claim 1, wherein the execution of the instructions further configures the computer system to:
    send a notification about the replacement amount to a user device associated with the ARD, the notification comprising an option to initiate a return of the replacement amount;
    receive a selection of the option; and
    generate another indication that a pickup of the replacement amount is to be performed.

5. A computer-implemented method, comprising:
    receiving, from a device, sensor data generated by a sensor of the device and indicating an amount of an item stored by the device, the sensor data being generated or received at a data collection frequency that is based at least in part on a consumption rate of the item and a power source of the device;
    storing, based at least in part on the sensor data, consumption data indicating the consumption rate;
    determining a plurality of available delivery methods for a delivery of a replacement amount of the item;
    selecting a delivery method from the plurality of available delivery methods based at least in part on the consumption rate;
    generating an indication that the delivery method is to be used for the delivery of the replacement amount of the item;
    receiving, from the device, additional sensor data indicating an updated amount of the item, the additional sensor data being received at a larger data collection frequency based at least in part on the updated amount being smaller than the amount of the item stored by the device; and
    determining an updated consumption rate based at least in part on the additional sensor data.

6. The computer-implemented method of claim 5, wherein the item is associated with a default delivery method, and wherein selecting the delivery method comprises:
    determining, based at least in part on the consumption data, a slope of the consumption rate; and
    selecting the delivery method as an accelerated delivery method relative to the default delivery method based at least in part on a determination that the slope indicates an increase in consumption of the amount of the item.

7. The computer-implemented method of claim 5, wherein the item is associated with a default delivery method, and wherein selecting the delivery method comprises:
    determining, based at least in part on the consumption data, a slope of the consumption rate; and
    selecting the delivery method as a decelerated delivery method relative to the default delivery method based at least in part on a determination that the slope indicates a decrease in consumption of the amount of the item.

8. The computer-implemented method of claim 5, wherein the item is associated with a default delivery method, and wherein selecting the delivery method comprises:
   determining, based at least in part on the consumption data, a slope of the consumption rate; and
   selecting the delivery method as the default delivery method based at least in part on a determination that the slope indicates a regular consumption of the amount of the item.

9. The computer-implemented method of claim 5, further comprising:
   determining, based at least in part on the additional sensor data, that the amount of the item stored by the device will be depleted prior to a completion of the delivery, wherein the additional sensor data is received after initiation of the delivery;
   selecting a second delivery method from the plurality of available delivery methods, the second delivery method being faster than the delivery method; and
   causing a second delivery of a second replacement amount based at least in part on the second delivery method.

10. The computer-implemented method of claim 9, further comprising:
   sending a notification about the replacement amount and the second replacement amount to a user device associated with the device, the notification comprising an option to initiate a return of the replacement amount.

11. The computer-implemented method of claim 5, further comprising:
   determining that the amount of the item stored by the device is less than a threshold amount; and
   comparing, based at least in part on the amount being less than the threshold amount, the consumption rate to an expected consumption rate, wherein the delivery method is selected based at least in part on the comparing.

12. The computer-implemented method of claim 5, further comprising:
   storing, in a profile associated with the device and with a user device, indication of the delivery method, the profile further storing the consumption data; and
   sending a notification about an initiation of the delivery to the user device.

13. One or more non-transitory computer-readable storage media storing instructions that, upon execution on a computer system, cause the computer system to perform operations comprising:
   receiving, from a device, sensor data generated by a sensor of the device and indicating an amount of an item stored by the device, the sensor data being generated or received at a data collection frequency that is based at least in part on a consumption rate of the item and a power source of the device;
   storing, based at least in part on the sensor data, consumption data indicating the consumption rate;
   determining a plurality of available delivery methods for a delivery of a replacement amount of the item;
   selecting a delivery method from the plurality of available delivery methods based at least in part on the consumption rate;
   generating an indication that the delivery method is to be used for the delivery of the replacement amount of the item;
   receiving, from the device, additional sensor data indicating an updated amount of the item, the additional sensor data being received at a larger data collection frequency based at least in part on the updated amount being smaller than the amount of the item stored by device; and
   determining an updated consumption rate based at least in part on the additional sensor data.

14. The one or more non-transitory computer-readable storage media of claim 13, wherein the delivery method is to a user location.

15. The one or more non-transitory computer-readable storage media of claim 13, wherein the operations further comprising:
   determining, based at least in part on the updated consumption rate, that the updated amount of the item will be depleted prior to a completion of the delivery;
   selecting a faster delivery method from the plurality of available delivery methods; and
   causing a second delivery of a second replacement amount of the item based at least in part on the faster delivery method.

16. The one or more non-transitory computer-readable storage media of claim 15, further comprising:
   causing the delivery of the replacement amount of the item to be re-routed from a first to a second location based at least in part on an initiation of the second delivery.

17. The one or more non-transitory computer-readable storage media of claim 13, wherein the operations further comprise:
   determining a historical consumption rate associated with at least one of: a user account associated with the device, other user accounts, or a type of the item;
   generated a weighted consumption rate based at least in part on a first weight applied to the consumption rate; and
   generating a weighted historical consumption rate based at least in part on a second weight applied to the historical consumption rate, wherein the delivery method is selected based at least in part on the weighted consumption rate and the weighted historical consumption rate.

18. The one or more non-transitory computer-readable storage media of claim 13, wherein the operations further comprise:
   determining, based at least in part on historical consumption rates, that the consumption rate is predictable with a confidence level, wherein the delivery method is selected based at least in part the confidence level.

19. The one or more non-transitory computer-readable storage media of claim 13, wherein the operations further comprise:
   sending, to a user device associated with the device, a notification about an initiation of the delivery of the replacement amount; and
   receiving, from the device, a confirmation indication that the delivery is to be performed.

20. The one or more non-transitory computer-readable storage media of claim 13, wherein the sensor data comprises an identifier of the device and raw data, wherein the consumption data is stored in a profile, wherein the profile stores an association between the identifier of the device and the item, and wherein the raw data comprises at least one or more of: weight data or optical data.

* * * * *